April 7, 1936. W. LEES 2,036,585
SHOCK ABSORBER FOR LOOMS
Filed Nov. 14, 1935
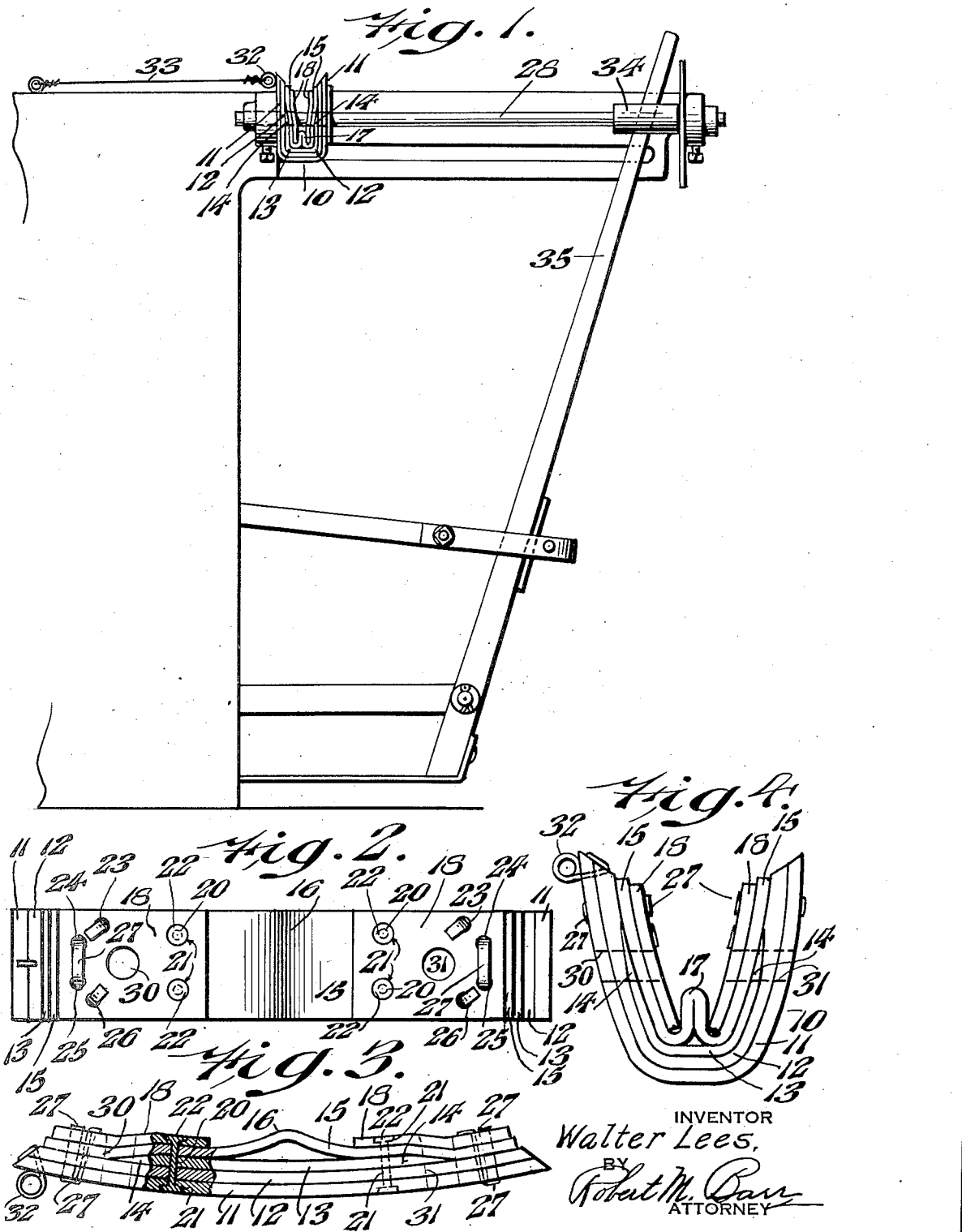
INVENTOR
Walter Lees,
BY
Robert M. Barr
ATTORNEY Patented Apr. 7, 1936

2,036,585

UNITED STATES PATENT OFFICE 2,036,585

SHOCK ABSORBER FOR LOOMS

Walter Lees, Philadelphia, Pa., assignor of one-half to Norman Lees, Philadelphia, Pa.

Application November 14, 1935, Serial No. 49,697

1 Claim. (Cl. 139—166)

The present invention relates to bumpers or shock absorbers and has particular reference to a bumper for receiving the impact of the picker of a loom and absorbing the shock thereof.

In looms of the picking stick type, it has heretofore been the practice to employ bumpers of one material or another for taking up the shock of the picker stick and in such devices it has been more or less common to employ metal rivets for holding parts of the bumper together. These rivets being of non-yielding material receive most of the shock intended for the softer material of the bumper, and therefore after a relatively short use so damage the pickers that the latter have to be repaired or replaced. Furthermore bumpers or shock absorbers of this type lack the resilience necessary for efficient and effective operation and are an added element of noise in the machine.

Some of the objects of the present invention are to provide an improved shock absorbing bumper for looms of the picking stick type; to provide a shock absorber which will withstand hard usage without damage to itself or to the pickers; to provide a shock absorber which materially reduces the noise of the picker sticks, is resilient, and maintains its normal effective shape throughout its life; to provide a shock absorber which is not dependent upon the use of metal, metal rivets, or other metal fastening means; to provide a shock absorber consisting of a plurality of layers of material, certain of which have characteristics and properties different from other layers; to provide a shock absorber consisting of layers of material of which raw hide forms an essential part; and to provide other improvements as will hereinafter appear.

In the accompanying drawing Fig. 1 represents a rear elevation of one end of a loom showing a shock absorber embodying one form of the present invention mounted upon the shuttle box together with associated picker parts; Fig. 2 represents a plan of the shock absorber of the present invention as assembled ready for bending to operative shape; Fig. 3 represents a side elevation of the device shown in Fig. 2; and Fig. 4 represents a side elevation of the shock absorber after being compressed to its operative shape.

Referring to the drawing one form of the present invention, as shown in Fig. 4 consists of a plurality of layers of material superposed one upon the other, fastened together in a manner to be described, and compressed to a generally U-shaped configuration. By reference to Fig. 3 it will be seen that the shock absorber 10 is made up of two superposed layers 11 and 12 of rectangular shaped chrome leather having scarfed ends. A rectangular strip of raw hide 13 is now placed on the top layer 12 in centered position and has its opposite ends scarfed as shown at 14 to provide a more or less tapering joint between it and a rectangular strip of relatively flexible oak leather 15 which is centered thereover and of substantially the same length as the strips of chrome leather 11 and 12. In connection with the strip 15 of oak leather it should be noted that in assembling this upon the other strips it is given a fullness 16 at its central portion which bulges outwardly and serves in the latter compression of the material to form a looped tongue 17 between the reversely bent sides of the material.

In order to fasten the aforesaid several pieces together in a manner to give great resilience, while at the same time maintaining yielding action, two relatively short rectangular strips of raw hide 18 are located respectively at opposite ends and between the beginning of the fullness 17 of the oak strip and the end thereof in each instance. With the parts so assembled two holes 20 are drilled through all the layers of material in close proximity to the inner end of each of the raw hide strips 18 and preferably each of these holes 20 has its ends counterbored as indicated at 21. Into each of these holes is then driven a raw hide peg 22 and its projecting ends then headed over into the counterbores 21, so that the five layers of material are permanently connected together and held against displacement, but permitting sufficient relative movement of the parts to insure the absorption of a blow tending to close the free ends of the bumper together. In addition to the holes held by the raw hide pegs 22, each end of the device is drilled through all of the layers with four holes 23, 24, 25 and 26. A raw hide lace 27 is then threaded through hole 23, back through hole 24, out through hole 25, and back through hole 26, and its two ends then flattened over by hammering against the face of the raw hide strip 18. Such a lace 27 is woven through each set of holes as will be understood and therefore the two ends of each layer of material are securely fastened together, but by means which gives a certain freedom of movement and an added resilience. When the parts have thus been secured together by the several raw hide fastenings, the device is placed in a forming die and subjected to pressure so that it is converted into the shape shown in Fig. 4 and remains in such form.

For the purpose of mounting the shaped bumper upon the spindle 28 of the loom, two alined holes 30 and 31 are bored through the layers of material and in such a position that when the spindle is inserted through the two holes 30 and 31, it will lie above and spaced from the tongue 17 of looped leather. In order to prevent the bumper from rebounding or travelling along the spindle 28 following the impact of the picker, a wire or other eye 32 may be secured to one side of the bumper and the latter then held in position by a wire 33 joined to a part of the loom frame. When assembled as shown in Fig. 1 the bumper is in the path of movement of the picker 34 when the latter is set into motion by the picker stick 35 and as a result the impact is absorbed by the bumper with less noise than heretofore and without damaging any of the moving parts. Furthermore the U-shape of the bumper brings into action two oppositely disposed legs, the ends of which are free to move toward and away from each other while being resiliently interconnected at their basal parts. It will also be noted that while the raw hide layer maintains a very desirable rigidity to the structure it is so interrelated with respect to the layer of chrome leather and the layer of oak leather that both of these leathers are free to expand and retract while being exposed to practically no wear. It is further believed that a new and novel method of making the picker stick bumper has been devised.

While only a single form is shown in which this invention may be embodied, it is to be understood that the invention is not limited to any specific construction, but might be applied to various forms without departing from the spirit of the invention or the scope of the appended claim.

Having thus described my invention, I claim:—

As a new article of manufacture, a picker stick bumper made of superposed strips of chrome leather, rawhide, and oak leather, one strip of rawhide being shorter than the leather strips and interposed between an oak leather strip and a chrome leather strip, said oak leather strip having a looped tongue projecting centrally thereof, rawhide strips disposed on opposite sides of said tongue, rawhide pegs uniting all of said layers together, rawhide lacings fastening the ends of the layers together, and a spindle receiving hole in each end of the bumper, said holes being located to come into alined relation when the bumper has been pressed to operating shape.

WALTER LEES.